Patented Feb. 5, 1974

3,790,570
SUBSTITUTED DIAMINO-s-TRIAZINES
Jacques Perronnet, Paris, and Jean-Pierre Demoute, Montreuil-sous-Bois, France, assignors to Roussel-UCLAF, Paris, France
No Drawing. Filed Nov. 30, 1971, Ser. No. 203,450
Claims priority, application France, Dec. 10, 1970, 7044500
Int. Cl. C07d 55/20
U.S. Cl. 260—249.8                    2 Claims

ABSTRACT OF THE DISCLOSURE

Novel 1,3,5-triazines of the formula

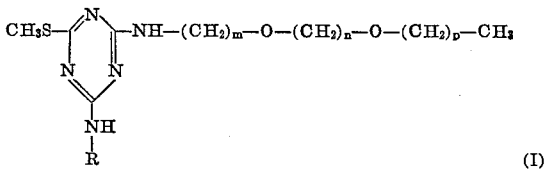

wherein R is a lower alkyl, m is 1 or 2, n is 1 or 2 and p is 0, 1 or 2 which have pre- and post-emergence herbicidal activity and their preparation.

OBJECTS OF THE INVENTION

It is an object of the invention to provide the novel 6-methylthio-1,3,5-triazines of Formula I.

It is another object of the invention to provide a novel process for the preparation of the 1,3,5-triazines of Formula I.

It is a further object of the invnetion to provide novel pre- and post-emergent herbicidal compositions.

It is an additional object of the invention to provide novel method of killing plants.

These and other objects and advantages of the invention will become obvious from the following detailed description.

THE INVENTION

The novel 6-methylthio-1,3,5-triazines of the invention have the formula

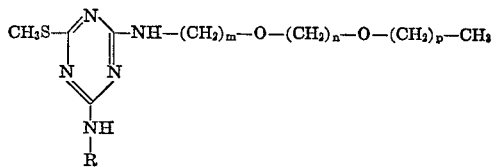

wherein R is a lower alkyl, m is 1 or 2, n is 1 or 2 and p is 0, 1 or 2. Particularly preferred is 2-(3',6'-dioxaoctylamino)-4-isopropylamino - 6 - methylthio - 1,3,5 - triazine. Lower alkyl is intended to mean alkyl of 1 to 7 carbon atoms such as methyl, ethyl, isopropyl, butyl, hexyl, etc.

The novel 1,3,5-triazines of Formula I are prepared by reacting an alkali metal thiomethylate with a 6-halo-triazine of the formula

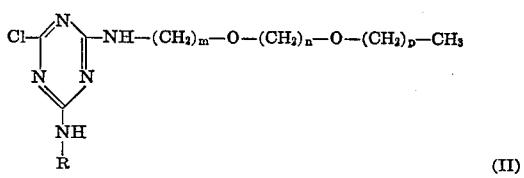

wherein R, m, n and p have the above definitions.

The preferred alkali metal thiomethylate is sodium thiomethylate and the reaction is preferably effected in a polar solvent such as ethanol although other solvents may be used. Examples are protic polar solvents such as alcohols like methanol and propanol and aprotic solvents such as tetrahydrofuran, dimethoxyethane, dimethylformamide or dimethylsulfoxide.

The triazines of Formula II can be prepared by a process analogous to that of France Pat. No. 1,552,086.

The novel herbicidal compositions are comprised of an effective amount of at least one 6-methylthio-1,3,5-triazine of Formula I and a carrier. The compositions may be in the form of powders, granules, suspensions, emulsions or solutions such as a mixture with a vehicle and/or anionic, cationic or nonionic surface active agent to assure, among other things, a uniform dispersion of the substances of the composition. The vehicle used may be a liquid such as water, alcohol, hydrocarbons or other organic solvents, a mineral, vegetable or animal oil or a powder such as talc, clays, silicates or kieselguhr.

The solid compositions in the form of powder for dusting, wettable powders or granules can be prepared by grinding the compounds of Formula I with an inert solid or by impregnating a solid support with a solution of the said compounds in a solvent which is then evaporated.

The herbicidal compositions may also contain other pesticides, herbicides and/or fungicides, biocides, insecticides, etc. and substances which have influencing properties on the growth of plants.

The novel herbicidal method of the invention comprises applying to the locus where the plants are to be killed a herbicidal amount of at least one 6-methylthio-1,3,5-triazine of Formula I. The compositions may be applied either pre-emergence or post-emergence. The exact dosage will depend upon the particular plants to be killed, the nature of the terrain and atmospheric conditions and the specific compound used.

In the following examples there are described several preferred embodiments to illustrate the invention. However, it should be understood that the invention is not intended to be limited to the specific embodiments.

EXAMPLE I 2-(3',6'-dioxaoctylamino)-4-isopropylamino-6-methylthio-1,3,5-triazine 158 ml. of a solution of 1.3 N sodium thiomethylate in ethanol were added over 5 minutes at 25° C. to a solution of 61 gm. of 2-(3',6'-dioxaoctylamino)-4-isopropylamino-6-chloro-1,3,5-triazine in 400 ml. of ethanol and the resulting suspension was stirred for 17 hours at 25° C. Sodium chloride was removed by filtering and the filtrate was evaporated to dryness under reduced pressure to obtain 63 g. of 2-(3',6'-dioxaoctylamino) - 4 - isopropylamino-6-methylthio-1,3,5-triazine in the form of a yellow oil with a refractive index $n_D^{24}=1.543$.

Analysis.—$C_{13}H_{25}N_5O_2S$; molecular weight=315.44. Calculated (percent): C, 49.5; H, 7.99; N, 22.2; S, 10.17. Found (percent): C, 49.6; H, 8.1; N, 22; S, 10.1.

As far as is known, this compound is not described in the literature.

EXAMPLE II

Pre- and Post-Emergence Herbicidal Activity

Oats, beets, wheat, crysanthemum, flax, corn, mustard and clover were cultivated in a culture flat (23 x 14 x 4 cm.) with a double bottom and watering from below. The eight species, using 20 seeds for each species, were planted in rows spaced 3 cm. apart in a single flat and 4 tests were run for each concentration. The growing conditions were as follows: temperature of 20° C. ±2°, about 60% humidity, and lighting by fluorescent lights (daylight +bright white) of 6 to 22 hours each day. The earth mixture was comprised of 10 volumes of arable soil, 10 volumes of river sand and 2 volumes of peat.

In the pre-emergence test, the treatment was effected 24 hours after the seeding and the first wetting was effected by aspersion so that a part of the product is entrained to the level of the seeds. In the post-emergence test, the treatment was effected after 21 days of culture on the above ground plants.

In both cases, 2-(3',6'-dioxaoctylamino)-4-isopropylamino-6-methylthio-1,3,5-triazine was applied under standard conditions with a micro sprayer at doses of 10, 5, 2.5 and 1.25 kg./ha. and at a dilution of 560 l./ha. Controls are submitted to the same conditions without treatment with the test product.

The final control was determined by the weight of the plants 21 days after treatment for the pre-emergence test and 15 days after treatment in the post-emergence test. The results were expressed as a percent reduction of vegetation P as follows:

$$P = \frac{\text{weight of control plants} - \text{weight of treated plants}}{\text{weight of control plants}} \times 100$$

The resuts are shown in Table I.

TABLE I

| Kg./ha | Post-emergence | | | | Pre-emergence | | | |
|---|---|---|---|---|---|---|---|---|
| | 10 | 5 | 2.5 | 1.25 | 10 | 5 | 2.5 | 1.25 |
| Plants: | | | | | | | | |
| Oats | | 100 | 91.0 | 91.0 | 72.0 | 40.0 | | |
| Beets | | 100 | | 100 | 94.0 | 88.0 | | |
| Wheat | | 100 | 92.0 | 76.0 | 74.0 | 54.0 | 45.0 | |
| Chrysanthemum | | 100 | | | | 100 | | |
| Flax | | 100 | | | | 100 | | |
| Corn | 47.0 | 44.0 | 40.0 | 30.0 | 41.0 | 24.0 | 6.0 | 0 |
| Mustard | | 100 | | | | 100 | | |
| Clover | | 100 | | | | 100 | | |

The post-emergence test at 1.25 kg./ha. destroyed completely the treated plants except for corn against which it had a weak activity. In the pre-emergence test at 1.25 kg./ha., flax, chrysanthemum, mustard, clover and beets were quite completely destroyed and half destroyed wheat and oats while being totally inactive against corn.

Various modifications of the compositions and methods of the invention may be made without departing from the spirit or scope thereof and it is to be understood that the invention is to be limited only as defined in the appended claims.

We claim:
1. A compound of the formula

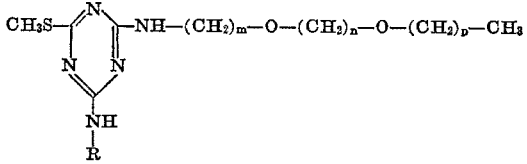

wherein R is a lower alkyl, $m$ is 1 or 2; $n$ is 1 or 2 and $p$ is 0, 1 or 2.

2. A compound of claim 1 which is 2-(3',6'-dioxaoctylamino)-4-isopropylamino - 6 - methylthio-1,3,5-triazine.

References Cited

UNITED STATES PATENTS

| 3,267,099 | 8/1966 | Acker | 260—249.8 |
| 3,326,914 | 6/1967 | Knusli et al. | 260—249.8 |
| 3,551,421 | 12/1970 | Bertin et al. | 260—249.8 |

JOHN M. FORD, Primary Examiner

U.S. Cl. X.R.

71—93